United States Patent
Ulrey et al.

(10) Patent No.: US 9,624,844 B2
(45) Date of Patent: *Apr. 18, 2017

(54) SYSTEM AND METHOD FOR EMPTYING A TANK

(71) Applicant: Ford Global Technologies, LLC, Dearborn, MI (US)

(72) Inventors: Joseph Norman Ulrey, Dearborn, MI (US); Ross Dykstra Pursifull, Dearborn, MI (US); Donald J. Lewis, Bath Springs, TN (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,145

(22) Filed: Jul. 22, 2015

(65) Prior Publication Data

US 2015/0322870 A1    Nov. 12, 2015

Related U.S. Application Data (63) Continuation of application No. 13/431,295, filed on Mar. 27, 2012, now Pat. No. 9,115,653.

(51) Int. Cl.
*F02D 19/00* (2006.01)
*F02D 19/02* (2006.01)
(Continued)

(52) U.S. Cl.
CPC ............. *F02D 19/027* (2013.01); *F02D 9/00* (2013.01); *F02D 13/0234* (2013.01);
(Continued)

(58) Field of Classification Search
CPC ........ F02D 19/06; F02D 19/08; F02D 19/081; F02D 19/061; F02D 19/0613;
(Continued)

(56) References Cited

U.S. PATENT DOCUMENTS 3,789,820 A * 2/1974 Douglas ............. F02M 21/0224
                                              123/1 A
4,416,244 A * 11/1983 McDonald .......... F02D 19/0647
                                              123/27 GE
(Continued)

FOREIGN PATENT DOCUMENTS

CN      101191447 A     6/2008
CN      102076938 A     5/2011
(Continued)

OTHER PUBLICATIONS

Partial Translation of Office Action of Chinese Application No. 2013100988030, Issued Jun. 3, 2016, State Intellectual Property Office of PRC, 8 Pages.
(Continued)

*Primary Examiner* — Thomas Moulis
(74) *Attorney, Agent, or Firm* — Julia Voutyras; McCoy Russell LLP (57) ABSTRACT

A system for method for emptying a gas storage tank of a vehicle is presented. In one example, engine valve timing is adjusted to facilitate reducing pressure within the gas storage tank. The system and method may extend the use of the gas stored in the gas storage tank.

20 Claims, 4 Drawing Sheets

(51) Int. Cl.
*F02D 19/08* (2006.01)
*F02D 13/02* (2006.01)
*F02D 9/00* (2006.01)
*F02D 41/00* (2006.01)
*F02D 19/06* (2006.01)

(52) U.S. Cl.
CPC ..... *F02D 19/0628* (2013.01); *F02D 19/0642* (2013.01); *F02D 19/08* (2013.01); *F02D 41/0027* (2013.01); *F02D 19/0647* (2013.01); *F02D 19/081* (2013.01); *F02D 2200/0406* (2013.01); *F02D 2200/0602* (2013.01); *Y02T 10/32* (2013.01)

(58) Field of Classification Search
CPC ............. F02D 19/0618; F02D 19/0628; F02D 19/0642; F02D 19/0647; F02D 19/0615; F02D 19/0623; F02D 19/0681; F02M 13/08; F02M 21/02; F02M 43/00; F02M 21/0242
USPC .............. 123/525, 527, 575, 198 D, 198 DB
See application file for complete search history.

(56) References Cited

U.S. PATENT DOCUMENTS

| | | | |
|---|---|---|---|
| 4,522,159 A | 6/1985 | Engel et al. | |
| 4,535,728 A | 8/1985 | Batchelor | |
| 4,742,801 A | 5/1988 | Kelgard | |
| 5,370,097 A * | 12/1994 | Davis | F02D 19/0631 123/27 GE |
| 5,373,702 A * | 12/1994 | Kalet | F17C 9/00 123/525 |
| 5,411,058 A * | 5/1995 | Welsh | F02D 19/0647 137/572 |
| 5,479,906 A * | 1/1996 | Collie | F02M 21/0212 123/304 |
| 5,483,943 A | 1/1996 | Peters | |
| 5,611,316 A * | 3/1997 | Oshima | F02M 21/0224 123/494 |
| 5,615,702 A | 4/1997 | Dawans et al. | |
| 5,632,250 A | 5/1997 | Kato et al. | |
| RE35,874 E * | 8/1998 | Neeser | F17C 9/00 123/525 |
| 5,937,800 A | 8/1999 | Brown et al. | |
| 6,003,478 A | 12/1999 | Huber | |
| 6,009,860 A | 1/2000 | Brown et al. | |
| 6,101,986 A | 8/2000 | Brown et al. | |
| 6,145,494 A | 11/2000 | Klopp | |
| 6,240,910 B1 | 6/2001 | Maekawa et al. | |
| 6,390,075 B1 | 5/2002 | Yamazaki et al. | |
| 6,405,947 B2 | 6/2002 | Fochtman | |
| 6,427,670 B2 * | 8/2002 | Goto | F02B 43/00 123/198 D |
| 6,467,466 B1 * | 10/2002 | Maekawa | F02D 41/0027 123/198 D |
| 6,708,718 B2 | 3/2004 | Yamada et al. | |
| 6,957,637 B2 * | 10/2005 | Lin | F02B 43/10 123/184.53 |
| 7,073,489 B2 * | 7/2006 | Sexton | F02M 21/06 123/527 |
| 7,131,432 B2 * | 11/2006 | Davis | F02M 21/0215 123/557 |
| 7,287,519 B2 | 10/2007 | Harrison | |
| 7,325,561 B2 | 2/2008 | Mathison et al. | |
| 7,367,312 B1 | 5/2008 | Boyer et al. | |
| 7,373,931 B2 | 5/2008 | Lennox et al. | |
| 8,166,953 B2 | 5/2012 | Caley | |
| 8,459,241 B2 * | 6/2013 | Dixon | F02B 43/10 123/27 GE |
| 8,516,998 B2 * | 8/2013 | Long | F02M 21/0212 123/527 |
| 8,623,277 B2 * | 1/2014 | Pivonka | A01M 15/00 141/59 |
| 8,903,630 B2 | 12/2014 | Pursifull | |
| 8,918,268 B2 | 12/2014 | Shinoda | |
| 8,919,932 B2 | 12/2014 | Yoshida | |
| 8,944,033 B2 | 2/2015 | Coldren et al. | |
| 8,973,560 B2 | 3/2015 | Krug | |
| 8,977,473 B2 | 3/2015 | Brown | |
| 2004/0139944 A1 | 7/2004 | Nakano et al. | |
| 2004/0144371 A1 | 7/2004 | Jauss | |
| 2006/0246177 A1 | 11/2006 | Miki et al. | |
| 2007/0000563 A1 | 1/2007 | Handa | |
| 2008/0103676 A1 | 5/2008 | Ancimer et al. | |
| 2009/0055077 A1 | 2/2009 | Schule | |
| 2010/0307454 A1 | 12/2010 | Ulrey et al. | |
| 2012/0060935 A1 * | 3/2012 | Carter | F02M 21/0221 137/14 |
| 2012/0143480 A1 | 6/2012 | Pursifull | |
| 2013/0000752 A1 * | 1/2013 | Saito | F02D 19/0681 137/455 |
| 2013/0013256 A1 * | 1/2013 | Saito | F02D 19/0681 702/183 |
| 2013/0199499 A1 | 8/2013 | Pursifull | |
| 2013/0220274 A1 * | 8/2013 | Deshpande | F02D 19/105 123/350 |
| 2014/0311454 A1 | 10/2014 | Pursifull et al. | |

FOREIGN PATENT DOCUMENTS

GB 2345729 A 7/2000
WO 2006079173 A1 8/2006

OTHER PUBLICATIONS

Partial Translation of Office Action of Chinese Patent Application No. 201310098803.0, Issued Feb. 4, 2017, State Intellectual Property Office of PRC, 8 pages.

* cited by examiner

SYSTEM AND METHOD FOR EMPTYING A TANK

CROSS REFERENCE TO RELATED APPLICATIONS

The present application is a continuation of U.S. patent application Ser. No. 13/431,295, entitled "SYSTEM AND METHOD FOR EMPTYING A TANK," filed Mar. 27, 2012, the entire contents of which are hereby incorporated by reference for all purposes.

FIELD

The present description relates to a system for emptying a storage tank of a vehicle. The system and method may be particularly useful for emptying tanks that are pressurized.

BACKGROUND AND SUMMARY

A vehicle may include a pressurized tank that holds fuel or some other gaseous substance that is used while the vehicle operates. For example, some vehicles operate using fuel that is supplied from a pressurized tank. The fuel is stored under pressure so that a greater quantity of fuel may be stored in the tank. Further, some high performance vehicles are supplied nitrous-oxide during high load conditions to improve engine performance. In still other vehicles, pressurized air is supplied from a tank to an engine to reduce turbocharger lag and improve vehicle launch performance. Thus, reductants, oxidants, dalliance, additives, and the like can be stored in a pressure vessel as gas, adsorbed gas, or as a liquid with a high vapor pressure.

A pressure regulator and valves are often included at the output of the storage tank to reduce the pressurized gas to a more suitable pressure for introduction to the engine. The pressurized gas may be introduced to an engine via delivery conduits including a manifold such as a fuel rail. Flow of gas from the storage tank may be stopped when pressure in the storage tank or in the delivery conduits reaches some threshold level so as not to interfere with engine operation. For example, a vehicle that operates on both gaseous and liquid fuels may switch from operating solely on a gaseous fuel to operating solely on a liquid fuel when pressure in the storage tank reaches some threshold lower pressure. If the engine were to continue operating while gaseous fuel was delivered from the storage tank, the engine might operate leaner than is desired because there might be an insufficient flow rate of fuel from the tank to the engine.

The inventors herein have recognized the above-mentioned disadvantages and have developed a method for emptying a tank, comprising: solely supplying a gaseous fuel to an engine when a pressure of the gaseous fuel is greater than a threshold pressure; and supplying the gaseous fuel and a liquid fuel when the pressure of the gaseous fuel is less than the threshold pressure.

By supplying liquid fuel and gaseous fuel to an engine when a pressure of a tank is less than a threshold, it may be possible to draw additional gas from the storage tank while providing liquid fuel to the engine so that the engine does not misfire or operate richer than is desired. For example, gas may flow from the storage tank to the engine at a lower rate than is desirable for operating the engine solely with the gaseous fuel. However, liquid fuel may be delivered along with the gaseous fuel that is arriving at a reduced rate to provide an air-fuel mixture that is desirable. Both the liquid and gaseous fuels provide energy to provide torque and rotate the engine when the mixture is combusted in a cylinder. In this way, the gaseous fuel tank may be evacuated of a pressurized gas while the engine provides acceptable performance. Further, the operating time or range of the vehicle and engine may be extended since the gaseous tank may be completely evacuated.

The present description may provide several advantages. In particular, the approach may extend engine and vehicle operating time. Further, the approach may be applicable to different types of fuel injection systems and gases. Further still, the approach may be applicable to bi-fuel and single fuel engines.

The present description provides for more completely consuming a substance stored under pressure. In one example, consuming more of a pressurized gaseous fuel may allow an operator to use more of a lower cost fuel or lower emissions fuel than would otherwise be possible in a given vehicle use cycle including refilling of both liquid and gaseous fuels. Further, in certain service situations, the approach may reduce the amount of gaseous fuel that may be vented into the atmosphere if a service procedure requires an empty gaseous fuel tank.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
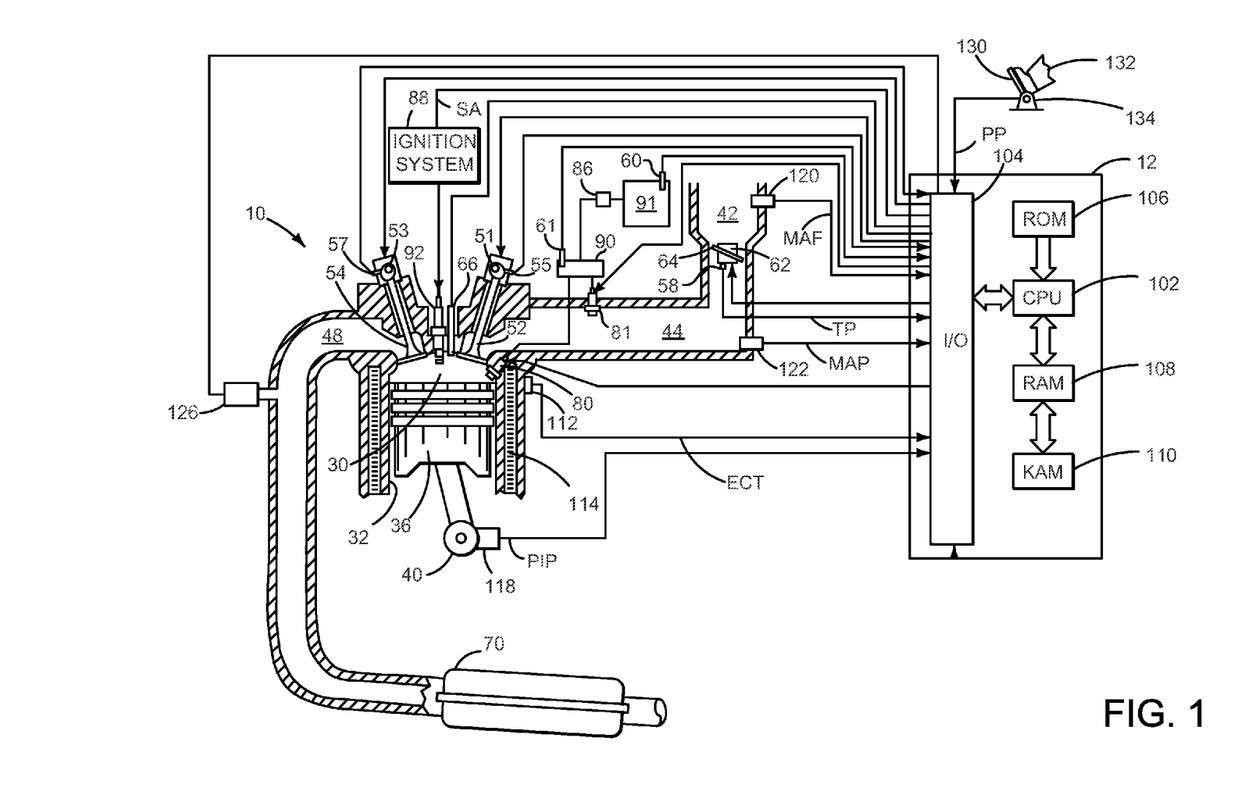
FIG. 1 is a schematic diagram of an engine.

The present description is related to emptying a tank that includes a pressurized gas aboard a vehicle. In one non-limiting example, the tank may be filled with a fuel such as compressed natural gas as illustrated in FIG. 1. The tank may be emptied as described in the simulated sequences provided in FIGS. 2 and 3. In one example, an engine may be operated to improve extraction of gas vapors from the tank so that the tank may be more thoroughly emptied. The method of FIG. 4 provides for improving the evacuation of tanks in direct fuel injection engines as well as in port fuel injected engines.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Direct liquid fuel injector 66 is shown positioned to inject liquid fuel directly into cylinder 30, which is known to those skilled in the art as direct injection. Alternatively, liquid fuel may be injected to an intake port, which is known to those skilled in the art as port injection. Direct liquid fuel injector 66 delivers liquid fuel in proportion to the pulse width from controller 12. Liquid fuel is delivered to direct liquid fuel injector 66 by a fuel system (not shown) including a fuel tank, fuel pump, and fuel rail (not shown).

Direct gaseous fuel injector 80 is shown positioned to inject gaseous fuel directly into cylinder 30. Port gaseous fuel injector 81 is shown positioned to inject gaseous fuel into intake manifold 44. In some examples, port gaseous fuel injector 81 may be positioned in an intake port of a cylinder head. In other examples, gaseous fuel injector 81 may inject gaseous fuel into a central area if an intake manifold. Both direct gaseous fuel injector 80 and port gaseous fuel injector 81 may provide gaseous fuel to engine 10. However, gaseous fuel may be supplied solely via direct gaseous fuel injector 80 without port gaseous fuel injector 81 in other examples. Additionally, gaseous fuel may be supplied solely via port gaseous fuel injector 81 without direct gaseous fuel injector 80 in still other examples.

Direct gaseous fuel injector 80 and port gaseous fuel injector 81 receive gaseous fuel via fuel rail 90 and storage tank 91. Pressure regulator 86 controls pressure that is delivered to fuel rail 90 by storage tank 91. Pressure of gas in storage tank 91 is sensed via pressure sensor 60. Pressure of gas in fuel rail 90 is sensed via pressure sensor 61. Direct gaseous fuel injector 80 and port gaseous fuel injector 81 may be controlled independently by controller 12 so that each delivers different flow rates at different times.

Intake manifold 44 is shown communicating with optional electronic throttle 62 that adjusts a position of throttle plate 64 to control air flow from air intake 42 to intake manifold 44. Electronic throttle 62 is shown positioned in between intake manifold 44 and air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
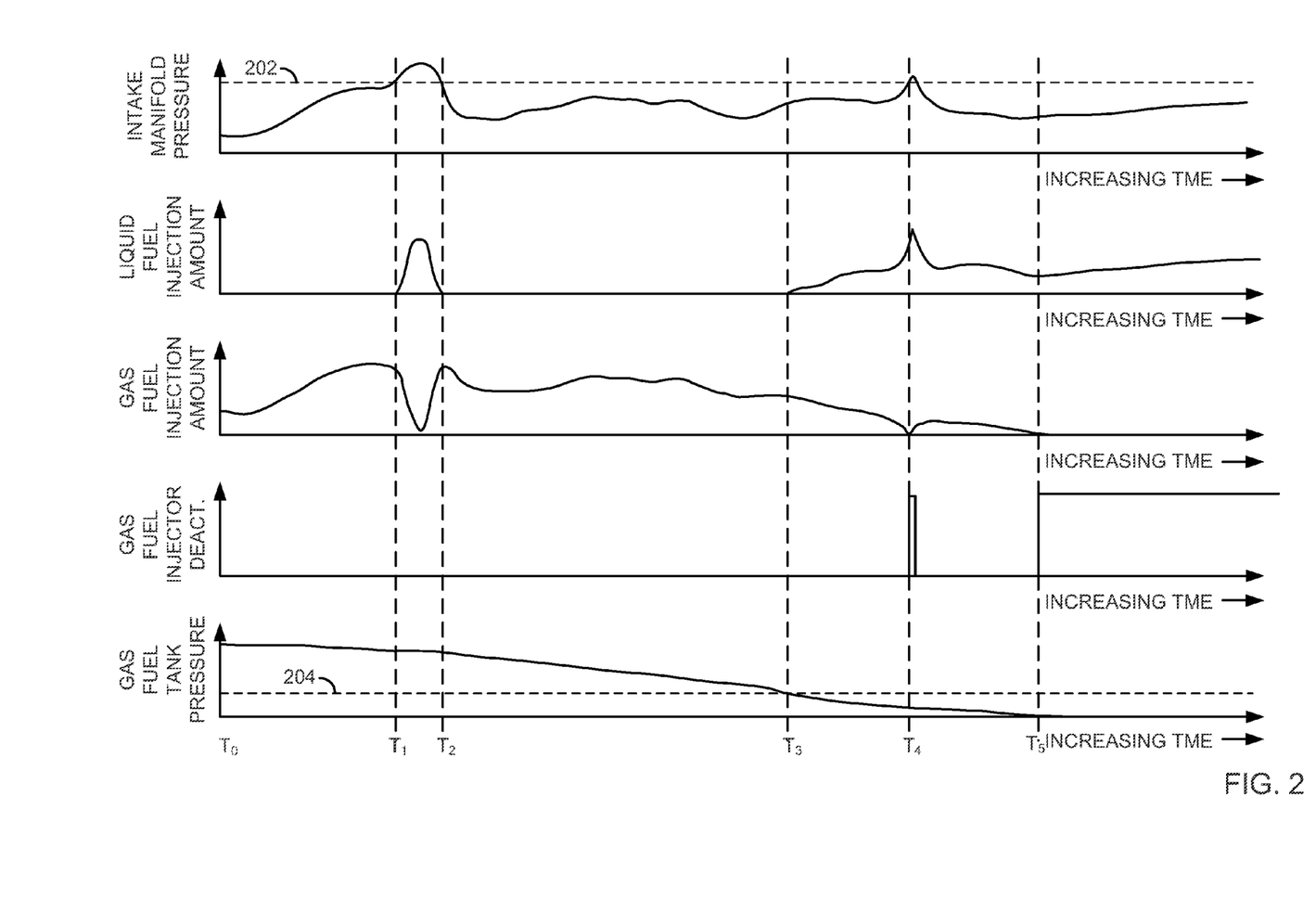
FIGS. 2 and 3 show simulated operating sequences according to the method of FIG. 4.

FIG. 2 shows a simulated operating sequence according to the method of FIG. 4 when the engine has port gaseous fuel injectors without direct gaseous fuel injectors. The sequence of FIG. 2 may be provided by the system of FIG. 1 according to the method of FIG. 4. Vertical markers are shown at times $T_0$-$T_5$ to identify particular times of interest during the sequence.

The first plot from the top of FIG. 2 represents engine intake manifold pressure versus time. The Y axis represents engine intake manifold pressure and intake manifold pressure increases in the direction of the Y axis arrow. The X axis represents time and time increases from the left side of FIG. 2 to the right side of FIG. 2. Horizontal marker 202 represents ambient air pressure. Pressure above ambient pressure is above horizontal marker 202. Pressure below ambient pressure is below horizontal marker 202.

The second plot from the top of FIG. 2 represents liquid fuel injection amount versus time. The Y axis represents the amount of liquid fuel injected to the engine and the amount of liquid fuel injected increases in the direction of the Y axis arrow. The X axis represents time and time increases from the left side of FIG. 2 to the right side of FIG. 2.

The third plot from the top of FIG. 2 represents gaseous fuel injection amount injected to the engine via a port gaseous fuel injector versus time. The Y axis represents an amount of gaseous fuel injected via a port or central injector. The amount of gaseous fuel injected to the engine increases in the direction of the Y axis arrow. The X axis represents time and time increases from the left side of FIG. 2 to the right side of FIG. 2.

The fourth plot from the top of FIG. 2 represents the state of port gaseous fuel injector deactivation and whether or not the port gaseous fuel injector is deactivated. The Y axis represents the operating state of the port gaseous fuel injector. The port gaseous fuel injector is active when the signal is at a low level. The port gaseous fuel injector is deactivated when the signal is at a higher level. The X axis represents time and time increases from the left side of FIG. 2 to the right side of FIG. 2.

The fifth plot from the top of FIG. 2 represents gaseous fuel rail/storage tank pressure versus time. The Y axis represents fuel pressure within the fuel pressure in the gaseous fuel storage tank and fuel pressure increases in the direction of the Y axis arrow. The X axis represents time and time increases from the left side of FIG. 2 to the right side of FIG. 2. Horizontal marker 204 represents a threshold pressure where liquid fuel injection is activated to provide desired combustion in the engine. In one example, horizontal marker 204 represents a fuel pressure where less than a desired amount of gaseous fuel flows to the engine than desired to provide a desired level of engine torque. The gaseous fuel pressure is at ambient pressure when the gaseous fuel pressure reaches the X axis.

At time $T_0$, engine intake manifold pressure is relatively low indicating a low engine load. The liquid fuel injection amount is substantially zero and the engine is operated solely with gaseous fuel, although the engine may have operated earlier in time with liquid fuel (e.g., during engine starting). The gaseous fuel injector is activated as indicated by the gaseous fuel injector deactivation status. The amount of gaseous fuel stored in the gaseous fuel tank is at a higher level.

Between time $T_0$ and time $T_1$, engine intake manifold pressure increases indicating that the engine is being operated at a higher engine load. The amount of gaseous fuel injected into the engine intake manifold or cylinder intake port increases as the engine intake manifold pressure increases so that the desired engine torque may be provided. The port gaseous fuel injector remains active and the pressure in the gaseous fuel tank decreases as gaseous fuel is consumed by the engine.

At time $T_1$, the intake manifold pressure reaches a higher pressure where the gaseous fuel injector is deactivated. The gaseous fuel injector may be deactivated so that engine output may be further increased when additional air is allowed to flow into the engine to be combined with liquid fuel. Additional air flows to the engine when the port or central gaseous fuel injector is deactivated because volume in the intake manifold is not displaced by the gaseous fuel. Thus, the amount of liquid fuel injected increases between time $T_1$ and time $T_2$ to increase engine output to meet a desired engine torque. The gaseous fuel injector is operable and not in a deactivated state when engine intake manifold pressure is elevated. The gaseous fuel tank pressure continues to be reduced as gaseous fuel is consumed.

At time $T_2$, the engine intake manifold pressure is reduced to a level where the gaseous fuel injector output increases and where the liquid fuel injector is deactivated. The gaseous fuel injector remains active and the gaseous fuel tank pressure continues to decrease as the gaseous fuel is consumed.

Between time $T_2$ and time $T_3$, intake manifold pressure increases and decreases with engine load. The engine load may increase or decrease in response to a driver demand torque. The gaseous fuel injector remains active and gaseous fuel is injected to the engine. The amount of gaseous fuel stored in the gaseous fuel storage tank continues to decrease as gaseous fuel is consumed by the engine.

At time $T_3$, pressure of the gaseous fuel stored in the gaseous fuel tank decreases to a level less than the predetermined threshold indicated by horizontal marker 204. At pressures below the threshold pressure indicated by horizontal marker 204, less than a desirable amount of fuel may flow from the gaseous fuel storage tank to the engine. The threshold pressure 204 may vary for different operating conditions. For example, the threshold pressure 204 may increase as engine intake manifold pressure increases.

The port or central gaseous fuel injector remains active and gaseous fuel continues to flow to the engine at time $T_3$. However, the amount of gaseous fuel supplied to the engine is augmented by injecting liquid fuel to the engine. Thus, the liquid fuel injector is activated to supply fuel to the engine cylinder. In this way, combustion stability and air-fuel ratio control may be controlled to desirable levels. Additionally, as intake manifold pressure increases with increasing engine load, less gaseous fuel is able to be introduced to the engine intake manifold. Therefore, the amount of liquid fuel as a percentage of both fuels entering the engine is increased as intake manifold pressure increases. As intake manifold pressure decreases with engine load more gaseous fuel can be introduced to the engine and as such the percentage of liquid fuel injected to the engine decreases. An oxygen sensor in the engine exhaust system may be used to correct the liquid fuel amount so that the combined mixture of gaseous and liquid fuel provides a desired air-fuel mixture when combined with air entering engine cylinders. Pressure of gaseous fuel stored in the gaseous storage tank continues to decrease as gaseous fuel is consumed by the engine.

At time $T_4$, the engine intake manifold pressure increases to a level greater than ambient air pressure and so the port or central gaseous fuel injector is deactivated and gaseous fuel flow into the engine temporarily ceases. Deactivating the gaseous fuel injector reduces the possibility of ambient air entering the gaseous storage tank when intake manifold pressure is high. In this way, air may be prevented from entering the storage tank at higher intake manifold pressures and lower storage tank pressures. The intake manifold pressure may reach pressures higher than ambient pressure when a compressor pressurizes air entering the engine.

Shortly after time $T_4$, the engine intake manifold pressure decreases to a level less than ambient pressure and the gaseous fuel injector is reactivated. Since the intake manifold pressure is lower than ambient pressure, the engine intake manifold may assist the flow of gaseous fuel from the storage tank to the engine. Thus, pressure of fuel in the gaseous storage tank may be reduced with assistance provided by a low pressure in the engine intake manifold. The liquid fuel injector continues to provide fuel to the engine as the amount of gaseous fuel continues to decrease.

At time $T_5$, pressure in the gaseous storage tank is reduced to ambient pressure and the gaseous fuel injector is deactivated so as to prevent ambient air from entering the gaseous storage tank. Further, deactivating the gaseous fuel injector when pressure of the gaseous fuel tank reaches ambient pressure prevents a vacuum forming in the gaseous storage tank so that no flow is induced between atmosphere and the gaseous fuel tank. The liquid fuel injector solely provides fuel to the engine after time $T_5$, and the liquid fuel amount is related to the engine load which can be reflected in the engine intake manifold pressure. In other examples, the gaseous storage tank may be reduced to a predetermined vacuum, if desired. In this way, pressure in the gaseous fuel tank may be reduced so that substantially all the fuel in the gaseous storage tank may be used to provide energy to operate the engine. Further, a smooth operating transition between operating the engine solely using gaseous fuel to operating the engine solely using liquid fuel is provided in this way.

Figure 3:
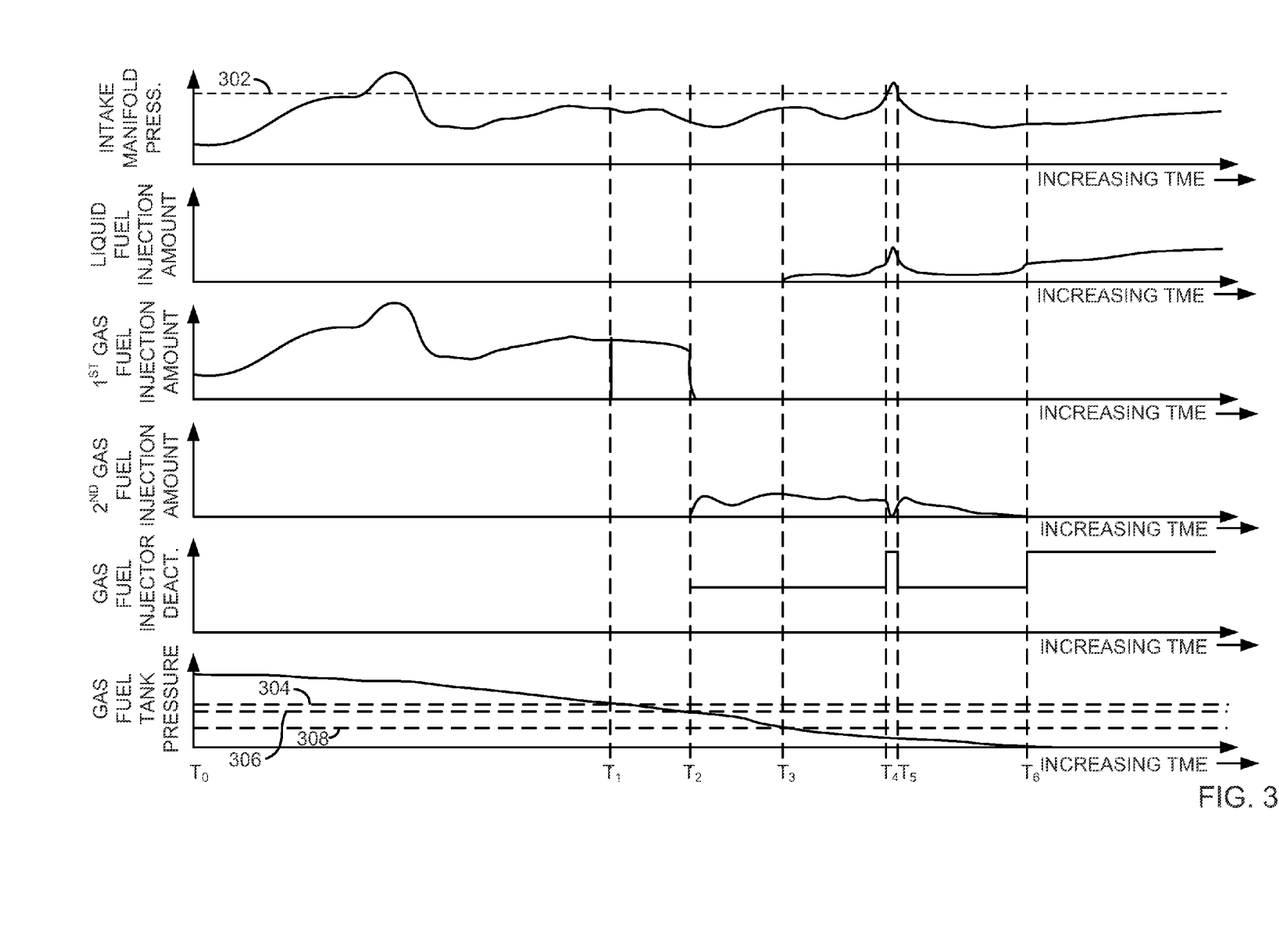
Figure 4:
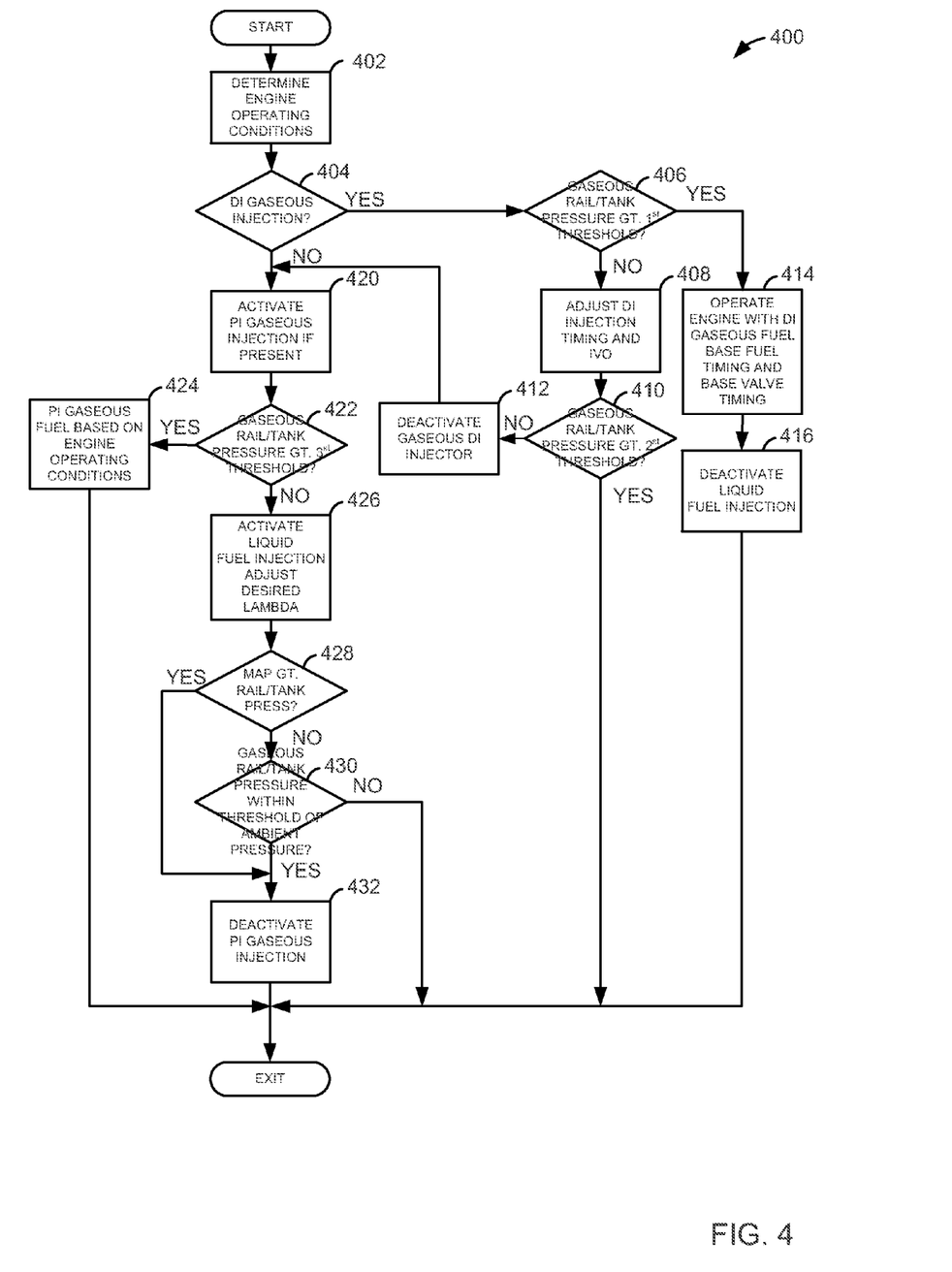
FIG. 4 is a flow chart of an example method for emptying a pressurized tank aboard a vehicle.

Referring now to FIG. 3, a second simulated operating sequence according to the method of FIG. 4 is shown. The sequence of FIG. 3 includes plots similar to those shown in FIG. 2. Therefore, description of similar plots is omitted for the sake of brevity. Differences between the figures are described. The sequence of FIG. 3 may be provided by the system of FIG. 1 according to the method of FIG. 4. Vertical markers are shown at times $T_0$-$T_6$ to identify particular times of interest during the sequence.

The example in FIG. 3 differs from the example in FIG. 2 in that the engine has gaseous fuel directly injected. Direct injection requires a fairly high injection pressure if the injection occurs after the intake valve is closed, thus leaving more pressure in the tank than may be desired during refilling. This example transitions the fueling from direct gaseous injection after IVC to direct injection before IVC and then perhaps PFI or CFI afterward. As gaseous fuel delivery limitations are encountered, gaseous fuel is augmented with liquid fuel. Further, the intake valve timing can be altered to improve engine vacuum, thus enabling further evacuation of the gaseous fuel tank.

The third plot from the top of FIG. 3 shows an amount of gaseous fuel injected via a $1^{st}$ gaseous direct fuel injector into a cylinder of an engine. The Y axis represents an amount of gaseous fuel injected to the engine via a gaseous direct fuel injector. The gaseous fuel amount increases in the direction of the Y axis arrow. The X axis represents time and time increases from the left side of FIG. 3 to the right side of FIG. 3.

The fourth plot from the top of FIG. 3 shows an amount of gaseous fuel injected via a 2nd gaseous port or central fuel injector into an engine intake system. The Y axis represents an amount of gaseous fuel injected to the engine via a gaseous port or central fuel injector. The gaseous fuel amount increases in the direction of the Y axis arrow. The X axis represents time and time increases from the left side of FIG. 3 to the right side of FIG. 3.

The fifth plot from the top of FIG. 3 represents a signal that indicates deactivation of gaseous fuel injectors. The direct gaseous fuel injector is deactivated when the signal is at a mid level. Both the direct gaseous fuel injector and the port or central fuel gaseous injector are deactivated when the signal is at a higher level. Both the direct gaseous fuel injector and the port or central fuel gaseous injector are active when the signal is at a lower level, but not necessarily injecting gaseous fuel.

Horizontal marker 302 represents ambient pressure. A pressure above marker 302 is higher than ambient pressure. A pressure below marker 302 is lower than ambient pressure. Horizontal marker 304 represents a first threshold storage tank pressure where engine operation is adjusted to continue to allow the direct gaseous fuel injector to continue to inject gaseous fuel to the cylinder. Horizontal marker 306 represents a second threshold storage tank pressure where the direct gaseous fuel injector is deactivated. Horizontal marker 308 represents a third threshold storage tank pressure where injection of liquid fuel commences as gas flow through the port or central fuel injector slows but continues.

At time $T_0$, the intake manifold pressure is low indicating the engine is operating at a low load. The liquid fuel injector is not injecting fuel to the engine and neither is the port or central gaseous fuel injector. The direct gaseous fuel injector is providing fuel to the engine, and pressure in the gaseous storage tank is relatively high.

Between time $T_0$ and time $T_1$, the engine intake manifold pressure increases and decreases with engine load. The direct gaseous fuel injector is delivered fuel at a pressure that allows direct injection to the engine during the compression stroke. The air entering the engine may be compressed via a compressor. The intake valve of a cylinder receiving gaseous fuel may open with ±20 crankshaft degrees of top-dead-center intake stroke during this time. The pressure in the gaseous fuel tank decreases as the engine continues to operate.

At time $T_1$, the pressure in the gaseous storage tank reaches the first threshold pressure and engine operation is adjusted to allow injection of fuel through the direct gaseous fuel injector to continue. In one example, the fuel injection timing moves from during the compression stroke to during the intake stroke when pressure in the cylinder is lower. As a result, fuel continued to flow through the direct gaseous fuel injector. Further, the intake valve opening time can be retarded to later than 20 crankshaft degrees after top dead center intake stroke so as to lower pressure in the cylinder during fuel injection.

At time $T_2$, the pressure in the gaseous storage tank reaches the second threshold pressure where the direct gaseous fuel injector is deactivated and fuel begins to flow through the port or central gaseous fuel injector. Since intake manifold vacuum may be low, gaseous fuel injection through the central gaseous fuel injector begins to further drain the storage tank. Gaseous fuel continues to drain through the central or port gaseous fuel injector between time $T_2$ and $T_3$.

At time $T_3$, the pressure in the gaseous storage tank reaches a third threshold pressure where the liquid fuel injector begins to inject liquid fuel to the engine so as to promote stable combustion when there may be insufficient pressure in the gaseous storage tank to operate the engine at a torque desired by a driver. Gaseous fuel also continues to flow to the engine at a lower rate further emptying the gaseous storage tank.

At between time $T_4$ and time $T_5$, intake manifold pressure increases to a level greater than ambient pressure. The port or central gaseous fuel injector is temporarily deactivated and gaseous fuel flow to the engine is stopped. Gaseous fuel injection to the engine continues after time $T_5$.

At time $T_6$, pressure in the gaseous storage tank reaches ambient pressure and both the direct and port gaseous fuel injectors are deactivated. Liquid fuel continues to be injected to the engine based on engine load.

Thus, in some examples, both direct and port gaseous fuel injectors may be operated to empty the gaseous fuel storage tank. Although FIGS. 2 and 3 mention gaseous fuel injectors, the description is not limited to gaseous fuels and applies to other gases such as nitrous oxide.

Referring now to FIG. 4, a flow chart of an example method for emptying a pressurized tank is shown. The method may be stored as executable instructions in non-transitory memory in a controller and system as is shown in FIG. 1. The method may provide the sequences of FIGS. 2 and 3.

At 402, method 400 determines engine operating conditions. Engine operating conditions may include but are not limited to engine speed, engine load, gaseous fuel pressure, ambient temperature, and engine coolant temperature. Method 400 proceeds to 404 after engine operating conditions are determined.

At 404, method 400 judges whether or not the engine includes direct gaseous fuel injectors. The engine fuel injector configuration may be stored in memory. If method 400 judges that the engine includes direct gaseous fuel injectors, the answer is yes and method 400 proceeds to 406. Otherwise, the answer is no and method 400 proceeds to 420.

At 406, method 400 judges whether or not a pressure of the gaseous fuel is greater than a first threshold. If method 400 judges the gaseous fuel pressure is greater than the first threshold, the answer is yes and method 400 proceeds to 414. Otherwise, the answer is no and method 400 proceeds to 408. The gaseous fuel pressure may be sensed within a gaseous storage tank or along a conduit or passage between the storage tank and the engine. In one example, the gaseous fuel pressure is determined within a fuel rail at a location downstream of a pressure regulator.

At 414, method 400 operates the engine via injecting gaseous fuel through a direct gaseous fuel injector. The direct gaseous fuel injector injects gaseous fuel during at least a portion of a compression stroke; however, start of gaseous fuel injection may begin late in the intake stroke (e.g., 20 crankshaft degrees before bottom-dead-center intake stroke). The intake valve timing is also set to base valve timing where the intake valve opens ±20 crankshaft degrees of top-dead-center intake stroke. Method 400 proceeds to 416 after gaseous fuel injection time is determined and delivered.

At 416, method 400 deactivates liquid fuel injection (e.g., gasoline fuel injection). The liquid fuel injection is deactivated so as to conserve liquid fuel. In one example, liquid fuel may be conserved for cold starting the engine. Thus, the engine may start using liquid fuel and then transition to operating solely using gaseous fuel. Method 400 proceeds to exit after injection of liquid fuel is deactivated.

At 408, method 400 adjusts direct gaseous fuel injection to inject a majority of gaseous fuel during the intake stroke of the cylinder. For example, 80% of the gaseous fuel injected during a cylinder cycle may be injected during an intake stroke of the cylinder. Additionally, the amount of engine torque may be limited to less than a threshold amount of torque in this mode since gaseous fuel displaces fresh air from a portion of the cylinder volume while the intake valve is open. If driver demand torque is greater than the threshold engine torque, injection of liquid fuel may be activated to provide the desired driver torque. Additionally, in one example, intake valve opening (IVO) time is adjusted to late in the intake stroke (e.g., delayed until at least later than 20 crankshaft degrees after top-dead-center intake stroke). In other examples, IVO may be delayed later than 90 crankshaft degrees after top-dead-center intake stroke. Method 400 proceeds to 410 after direct gaseous fuel injection timing and intake valve timing are adjusted.

At 410, method 400 judges whether or not gaseous fuel pressure is greater than a second threshold pressure. If so, the answer is yes and method 400 proceeds to exit and fuel is directly injected and intake valve timing are adjusted according to 408. Otherwise, the answer is no and method 400 proceeds to 412.

At 412, method 400 deactivates the direct gaseous fuel injectors and injection of gaseous fuel directly into the engine cylinder ceases. The direct gaseous fuel injector may be deactivated by simply commanding the direct gaseous fuel injector off. Method 400 proceeds to 420 after the direct gaseous fuel injector is deactivated.

At 420, method 400 activates port or centrally injected gaseous fuel injection when port or central gaseous fuel injection is available. Port or central gaseous fuel injection may be available with liquid and direct gaseous fuel injection as shown in FIG. 1. Further, the fuel injection system may include port or central gaseous fuel injection and liquid fuel injection without direct gaseous fuel injection. Method 400 proceeds to 422 after port or central gaseous fuel injectors are activated.

At 422, method 400 judges whether or not gaseous fuel pressure in the gaseous fuel storage tank or in the fuel rail is greater than a third threshold. If so, the answer is yes and method 400 proceeds to 424. If not, the answer is no and method 400 proceeds to 426.

At 424, method 400 injects gaseous fuel via the port or central fuel injector based on engine operating conditions (e.g., engine speed and load). Further, the engine valve timing may be set base valve timing where the intake valves open within ±20 crankshaft degrees of top-dead-center intake stroke. In some examples, liquid fuel injection may be activated when driver demand torque is greater than a threshold so that the engine may meet the driver demand torque. Method 400 proceeds to exit after port or central gaseous fuel injectors supply gaseous fuel to the engine according to engine operating conditions.

At 426, method 400 activates liquid fuel injection and adjusts a desired exhaust lambda value. The exhaust lambda value is an exhaust oxygen concentration provided by a stoichiometric air-fuel ratio divided by a desired or actual air-fuel ratio. Thus, the engine air-fuel mixture is lean when lambda is greater than 1, and the engine air-fuel mixture is rich when the lambda value is less than 1. Feedback of the lambda value is provided via an oxygen sensor in the exhaust system. In one example, the amount of gaseous fuel entering the cylinder is estimated from the gaseous fuel pressure and the injector on time. If there is insufficient gaseous fuel flow to a cylinder to provide a desired level of engine torque, liquid fuel is injected along with the gaseous fuel to meet the desired engine torque. For example, if a desired engine torque is 200 N-m and the injected gaseous fuel amount can provide 60 N-m, the liquid fuel injector is turned on to provide 140 N-m of torque. The engine air amount is adjusted to provide a desired lambda value via adjusting a position of a throttle or valve timing. Thus, when engine intake manifold pressure is increasing due to increasing engine load, gaseous fuel flow is reduced and liquid fuel flow is increased. Further, when engine intake manifold pressure decreases due to a reduced engine load, a percentage of liquid fuel delivered to the engine relative to the total amount of fuel provided to the engine is decreased. Method 400 proceeds to 428 after the gaseous and liquid fuel amounts are provided.

At 428, method 400 judges whether or not manifold absolute pressure is greater than gaseous fuel pressure in the storage tank or in the fuel rail. If so, the answer is yes and method 400 proceeds to 432. Otherwise, the answer is no and method 400 proceeds to 430.

At 430, method 400 judges whether or not gaseous fuel pressure in the storage tank or fuel rail is within a threshold pressure of ambient pressure. For example, method 400 judges whether or not pressure in the storage tank is within 1 bar of atmospheric pressure. If gaseous fuel pressure is within a threshold pressure of ambient pressure, method 400 proceeds to 432. Otherwise, method 400 proceeds to exit.

At 432, method 400 deactivates gaseous fuel injection to the engine. The gaseous fuel injection may be deactivated by simply commanding the gaseous fuel injector to an off state. The gaseous fuel injector may be deactivated until the gaseous fuel tank is refilled. Method 400 proceeds to exit after gaseous fuel injection is deactivated.

In this way, method 400 may begin gaseous fuel injection via direct injector and transition to injecting gaseous fuel via port or central injectors. Further, method 400 may deactivate all gaseous fuel injectors when pressure in the gaseous fuel storage tank is less than a threshold. In this way, engine and gaseous fuel injector operation may be adjusted to reduce an amount of pressure and gaseous fuel in a gaseous fuel storage tank.

Thus, the method of FIG. 4 provides for a method for emptying a tank, comprising: solely supplying a gaseous fuel to an engine when a pressure of the gaseous fuel is greater than a threshold pressure; and supplying the gaseous fuel and a liquid fuel when the pressure of the gaseous fuel is less than the threshold pressure. In this way, the engine may continue to operate and provide torque while additional gas is drawn from the gaseous fuel storage tank. The method further comprises deactivating a fuel injector that is supplied with the gaseous fuel when engine intake manifold pressure is greater than ambient pressure.

In another example, the method further comprises deactivating the fuel injector that is supplied with the gaseous fuel when a pressure of the gaseous fuel is substantially at ambient pressure. The method also includes where the fuel injector that is supplied with gaseous fuel injects the gaseous fuel into an intake manifold. The method includes where the pressure of the gaseous fuel is within a storage tank. The method also includes where the pressure of the gaseous fuel is within a passage between a storage tank and the engine.

In another example, the method of FIG. 4 provides for a method for emptying a tank, comprising: supplying a gaseous fuel to an engine via a tank; operating the engine with the gaseous fuel and a first valve timing at a first condition when a pressure of the gaseous fuel is greater than a first threshold; and operating the engine with the gaseous fuel and a second valve timing at the first condition when the pressure of the gaseous fuel is less than the first threshold. In this way, intake valve timing can be adjusted to increases an amount of vacuum in a cylinder thereby inducing flow from the gaseous storage tank to the engine.

The method includes where the first condition is an engine speed and load. The method also includes where an intake valve of the engine opens later relative to a crankshaft position when the pressure of the gaseous fuel is less than the first threshold as compared to when the intake valve opens when the pressure of the gaseous fuel is greater than the first threshold. The method further comprises injecting the gaseous fuel to a cylinder of the engine during an intake stroke of the cylinder when the pressure of the gaseous fuel is less than the first threshold. The method further comprises injecting the gaseous fuel to the cylinder of the engine during a compression stroke of the cylinder when the pressure of the gaseous fuel is greater than the first threshold. The method further comprises directly injecting the gaseous fuel into a cylinder of the engine via an injector, and deactivating the injector when a pressure in the tank is substantially at ambient pressure.

In yet another example, the method of FIG. 4 provides for a method for emptying a tank, comprising: supplying a gaseous fuel to an engine via a tank; operating the engine with first gaseous fuel injector when a pressure of the gaseous fuel is greater than a first threshold; and operating the engine with a second gaseous fuel injector when the pressure of the gaseous fuel is less than the first threshold. The method includes where the first gaseous fuel injector injects the gaseous fuel directly into a cylinder, and where the second gaseous fuel injector injects the gaseous fuel into an intake manifold. The method also includes where the first gaseous fuel injector is deactivated when the pressure of the gaseous fuel is less than the first threshold. The method also includes where the second gaseous fuel injector is deactivated when the pressure of the gaseous fuel is substantially ambient pressure.

In another example, the method of further comprises activating a liquid fuel injector when the pressure of the gaseous fuel is less than a second threshold. The method further comprises adjusting an engine air-fuel ratio in response to an output of an oxygen sensor via adjusting injection timing of the liquid fuel injector. The method further comprises retarding opening timing of an intake valve of the engine in response to the pressure of the gaseous fuel while the first gaseous fuel injector is activated and while the second gaseous fuel injector is not activated. The method further comprises deactivating the second gaseous fuel injector when a pressure of an intake manifold is greater than ambient pressure. Although some examples describe injecting a gaseous fuel, it should be understood that other gases not comprising a fuel may also be injected as is described herein.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for emptying a tank, comprising:
   solely supplying a gaseous fuel to an engine when a pressure of the gaseous fuel is greater than a threshold pressure;
   supplying the gaseous fuel and a liquid fuel when the pressure of the gaseous fuel is less than the threshold pressure; and
   deactivating the supply of gaseous fuel to the engine when engine intake manifold pressure is greater than the pressure of the gaseous fuel.

2. The method of claim 1, further comprising deactivating the supply of gaseous fuel to the engine when engine intake manifold pressure is greater than ambient pressure.

3. The method of claim 2, further comprising deactivating the supply of gaseous fuel to the engine when a pressure of the gaseous fuel is substantially at ambient pressure.

4. The method of claim 3, where a fuel injector that is supplied with gaseous fuel injects the gaseous fuel into an intake manifold.

5. The method of claim 3, where the pressure of the gaseous fuel is within a storage tank.

6. The method of claim 3, where the pressure of the gaseous fuel is within a passage between a storage tank and the engine.

7. A method for emptying a tank, comprising:
supplying a gaseous fuel to an engine via a tank;
operating the engine with the gaseous fuel and a first valve timing at a first condition when a pressure of the gaseous fuel is greater than a first threshold;
operating the engine with the gaseous fuel and a second valve timing at the first condition when the pressure of the gaseous fuel is less than the first threshold; and
deactivating the gaseous fuel at each of intake manifold pressure greater than the pressure of the gaseous fuel and pressure of the gaseous fuel substantially at ambient pressure.

8. The method of claim 7, where the first condition is an engine speed and load.

9. The method of claim 7, where an intake valve of the engine opens later relative to a crankshaft position when the pressure of the gaseous fuel is less than the first threshold as compared to when the intake valve opens when the pressure of the gaseous fuel is greater than the first threshold.

10. The method of claim 7, further comprising injecting the gaseous fuel to a cylinder of the engine during an intake stroke of the cylinder when the pressure of the gaseous fuel is less than the first threshold.

11. The method of claim 10, further comprising injecting the gaseous fuel to the cylinder of the engine during a compression stroke of the cylinder when the pressure of the gaseous fuel is greater than the first threshold.

12. The method of claim 7, further comprising directly injecting the gaseous fuel into a cylinder of the engine via an injector.

13. A method for emptying a tank, comprising:
supplying a gaseous fuel to an engine via a tank;
operating the engine with a first gaseous fuel injector when a pressure of the gaseous fuel is greater than a first threshold;
operating the engine with a second gaseous fuel injector when the pressure of the gaseous fuel is less than the first threshold; and
deactivating each of the first and second injectors in response to the pressure of the gaseous fuel reaching different thresholds, respectively.

14. The method of claim 13, where the first gaseous fuel injector injects the gaseous fuel directly into a cylinder, and where the second gaseous fuel injector injects the gaseous fuel into an intake manifold.

15. The method of claim 14, where the first gaseous fuel injector is deactivated when the pressure of the gaseous fuel is less than the first threshold.

16. The method of claim 14, where the second gaseous fuel injector is deactivated when the pressure of the gaseous fuel is substantially ambient pressure.

17. The method of claim 16, further comprising activating a liquid fuel injector when the pressure of the gaseous fuel is less than a second threshold.

18. The method of claim 16, further comprising adjusting an engine air-fuel ratio in response to an output of an oxygen sensor via adjusting injection timing of a liquid fuel injector.

19. The method of claim 13, further comprising retarding opening timing of an intake valve of the engine in response to the pressure of the gaseous fuel while the first gaseous fuel injector is activated and while the second gaseous fuel injector is not activated.

20. The method of claim 13, further comprising deactivating the second gaseous fuel injector when a pressure of an intake manifold is greater than ambient pressure.

* * * * *